(12) United States Patent
Goel et al.

(10) Patent No.: US 10,394,921 B2
(45) Date of Patent: Aug. 27, 2019

(54) CAREER PATH NAVIGATION

(71) Applicant: Microsoft Technology Licensing, LLC, Redmond, WA (US)

(72) Inventors: Vaibhav Goel, Mountain View, CA (US); Trevor Walker, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/292,679

(22) Filed: May 30, 2014

(65) Prior Publication Data
US 2015/0347606 A1 Dec. 3, 2015

(51) Int. Cl.
*G06F 16/954* (2019.01)
*G06Q 10/06* (2012.01)
(Continued)

(52) U.S. Cl.
CPC ..... *G06F 16/954* (2019.01); *G06Q 10/06316* (2013.01); *G06Q 30/0202* (2013.01); *G06Q 50/2057* (2013.01)

(58) Field of Classification Search
CPC .... G06Q 10/1053; G06Q 10/06; G06Q 10/10; G06Q 50/01; G06Q 30/02; G06Q 10/105; G06Q 10/063112; G06Q 10/06393; G06Q 10/067; G06Q 10/06398; G06Q 10/103; G06Q 10/063; G06Q 10/0631; G06Q 10/06311; G06Q 10/063118;
(Continued)

(56) References Cited

U.S. PATENT DOCUMENTS 7,509,230 B2 * 3/2009 Fernandez et al. ........... 702/179
8,046,307 B2 * 10/2011 Habichler et al. ............ 705/320
(Continued)

FOREIGN PATENT DOCUMENTS

CN 102930370 A 2/2013
CN 103294816 A 9/2013
(Continued)

OTHER PUBLICATIONS

"International Application Serial No. PCT/US2015/019035, International Search Report dated Jun. 9, 2015".
(Continued)

*Primary Examiner* — Stephanie Z Delich
(74) *Attorney, Agent, or Firm* — Schwegman Lundberg & Woessner, P.A.

(57) ABSTRACT

In various example embodiments, a system and method for career path navigation are presented. A request to identify a set of positions sequentially related to an origin position may be received. The request may be associated with a user of a social network service. Member profiles from among a plurality of member profiles of the social network service may be identified based on the origin position. A plurality of positions may be extracted from the identified member profiles. The set of positions may be determined from among the extracted plurality of positions based on a sequential relationship between the origin position and respective positions of the extracted plurality of positions. At least a portion of the set of positions may be caused to be presented to the user.

13 Claims, 11 Drawing Sheets

(51) Int. Cl.
*G06Q 30/02* (2012.01)
*G06Q 50/20* (2012.01)

(58) Field of Classification Search
CPC ......... G06Q 10/06315; G06Q 10/0637; G06Q 10/0639; G06Q 30/0201; H04L 67/306; H04L 67/22
See application file for complete search history.

(56) References Cited

U.S. PATENT DOCUMENTS

| | | | |
|---|---|---|---|
| 8,244,551 B1 * | 8/2012 | Mund | 705/1.1 |
| 2002/0026452 A1 * | 2/2002 | Baumgarten et al. | 707/104.1 |
| 2003/0220811 A1 * | 11/2003 | Fan | G06Q 10/10 705/328 |
| 2005/0114203 A1 * | 5/2005 | Savitsky | G06Q 10/105 705/320 |
| 2010/0057659 A1 * | 3/2010 | Phelon | G06Q 10/00 706/46 |
| 2010/0082356 A1 * | 4/2010 | Verma et al. | 705/1 |
| 2012/0226623 A1 | 9/2012 | Jurney et al. | |
| 2013/0166466 A1 | 6/2013 | Sanger | |
| 2013/0212031 A1 * | 8/2013 | Barnfield et al. | 705/320 |
| 2014/0122472 A1 | 5/2014 | Wells | |
| 2015/0317759 A1 * | 11/2015 | Jing | G06Q 50/2057 705/328 |

FOREIGN PATENT DOCUMENTS

| | | |
|---|---|---|
| CN | 103502975 A | 1/2014 |
| CN | 103778228 A | 5/2014 |
| CN | 105279569 A | 1/2016 |
| IN | 865DEL2015 A | 8/2016 |
| WO | WO-2015183363 A1 | 12/2015 |

OTHER PUBLICATIONS

"International Application Serial No. PCT/US2015/019035, Written Opinion dated Jun. 9, 2015".

"International Application Serial No. PCT/US2015/019035, International Preliminary Report on Patentability dated Jun. 24, 2016", 20 pgs.

"Office Action Issued in Chinese Patent Application No. 201510198988.1", dated Aug. 1, 2018, 27 Pages.

* cited by examiner

US 10,394,921 B2

CAREER PATH NAVIGATION

TECHNICAL FIELD

Embodiments of the present disclosure relate generally to online social networking, and more particularly, but not by way of limitation, to career path navigation.

BACKGROUND

Few pursuits are given more consideration than an individual's career path. With a nearly infinite number of career paths to choose from, the decision can be daunting. Providing accurate and useful information may assist in determining a career path. Conventionally, such career path information has been confined to word of mouth advice or scattered across a diverse set of literature. Such career path information is often susceptible to subjective bias as it is sparsely supported by factual information based on real world data.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
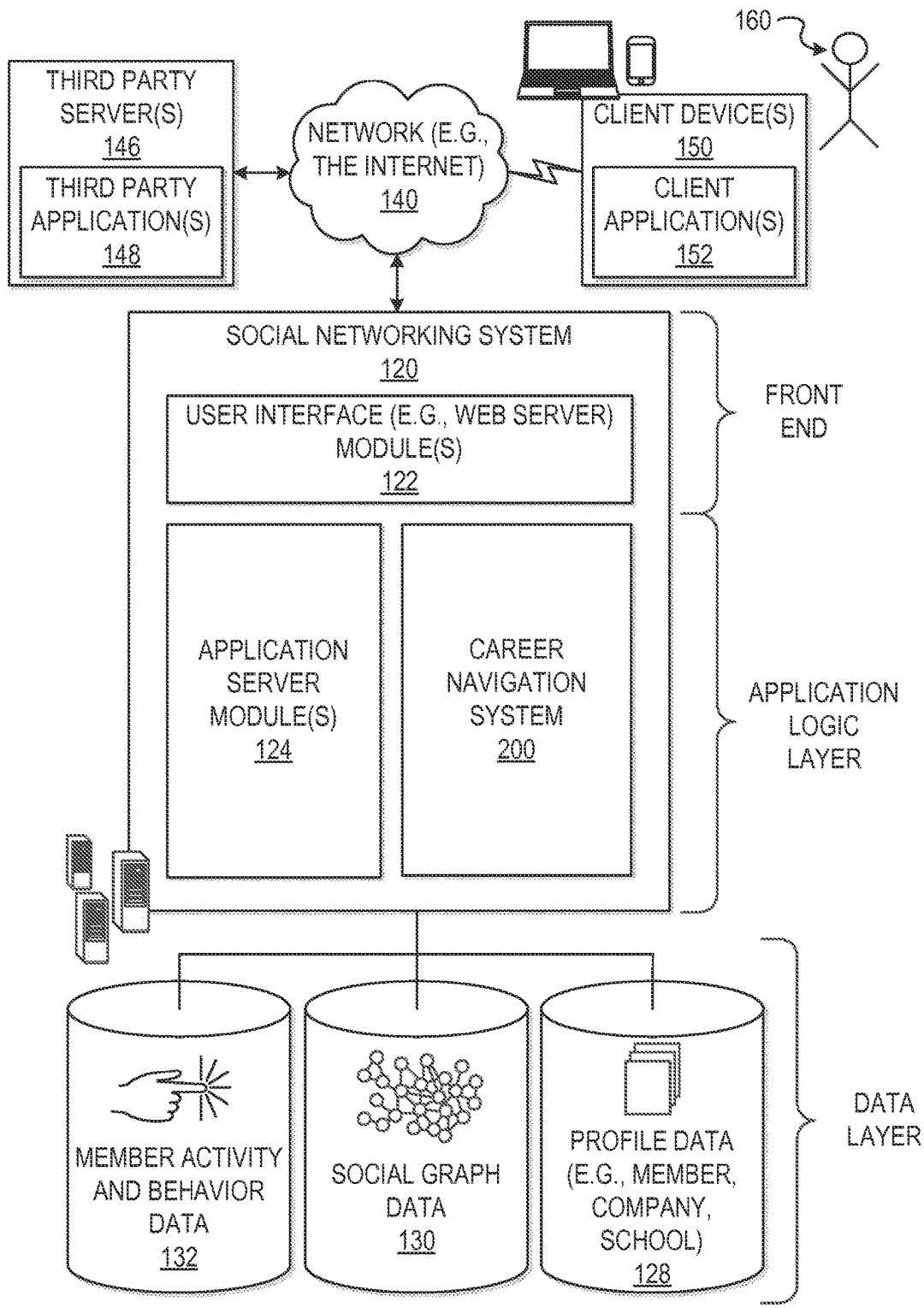
FIG. 1 is a network diagram depicting a client-server system within which various example embodiments may be deployed.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, systems and methods for career path navigation are described. A career path may be conceptualized as a sequence of positions in time that include a variety of attributes (e.g., industry, company, duration, seniority, pay level) associated with each position. Such sequences are often completely unique to an individual. However, a commonality may arise in various transitions from position to position. For instance, to achieve the position of principal of a school an individual typically holds the position of vice-principal first. Online professional networks such as LinkedIn® maintain a dynamic, constantly updated and massive scale professional profile dataset spanning career records from hundreds of industries, millions of companies, and hundreds of millions of people worldwide. Analyzing the large body of profile data, including positions held by members, maintained by a social network service may allow likely transitions between positions to be identified and a wide variety of career paths to be navigated.

In an example embodiment, a request to identify a set of positions sequentially related to an origin position may be received. For instance, a user of a social network service may provide an indication of the origin position (e.g., a position of interest to the user) to a user interface configured to receive an indication of the origin position. Member profiles from among a plurality of member profiles of the social network service may be identified based on the origin position (e.g., members who have held the origin position at any point in time). A plurality of positions may be extracted from the member profiles. The plurality of positions may include sequences of positions corresponding to members of the social network. The positions may be temporally ordered (e.g., ordered starting with a first position in time of a member and ending with the member's most recent or current position). A set of positions may be determined from among the extracted plurality of positions based on a sequential relationship between the origin position and respective positions of the extracted plurality of positions. For instance, if the origin position is vice-principal, the set of positions may include precedent positions (e.g., teacher or principal's assistant) and succedent positions (e.g., principal) to the origin position. In various example embodiments, the succedent and precedent positions may be directly prior to or after the origin position in the respective sequence of positions. At least a portion of the set of positions may be caused to be presented to the user. The user may provide a position selection from among the set of positions. The position selection may be a new origin position and further sets of positions may be identified based on the new origin position and presented to the user. In this way, the user may navigate career paths identified from member profile data of a social network service.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a career navigation system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
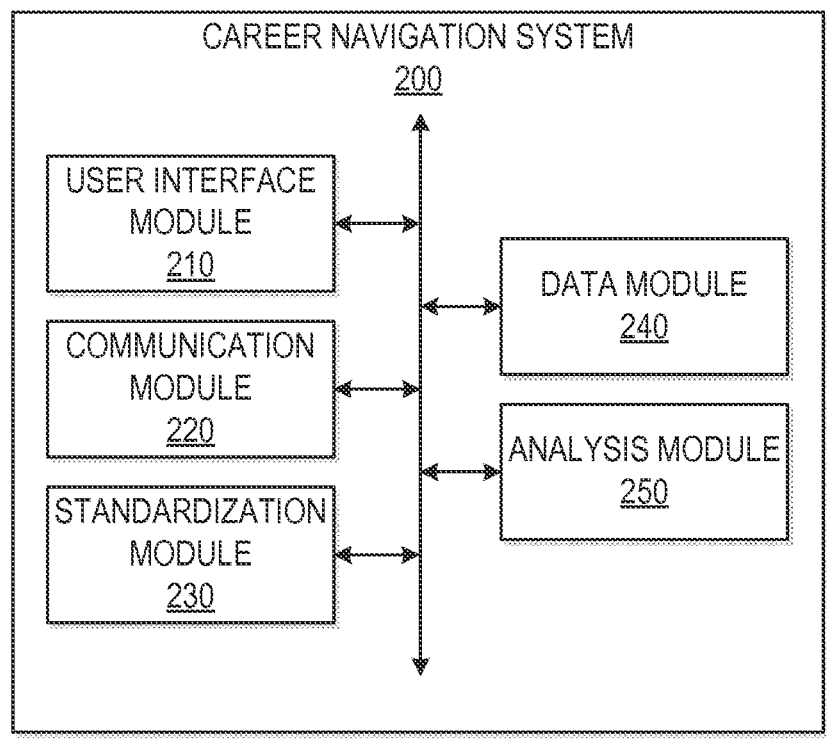
FIG. 2 is a block diagram depicting an example embodiment of a career navigation system.

FIG. 2 is a block diagram showing example components provided within the career navigation system 200, according to example embodiments. The career navigation system 200 may include a user interface module 210, a communication module 220, a standardization module 230, data module 240, and an analysis module 250. All, or some, of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 210 may provide a variety of user interface functionality such as generating user interfaces, interactively presenting user interfaces to the user, receiving information from the user (e.g., interactions with user interfaces), and so on. Presenting information to the user is intended to include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth).

The communication module 220 may perform various communication functions to facilitate the functionality described herein. For example, the communication module 220 may communicate with the social networking system 120 via the network 140 using a wired or wireless connection. The communication module 220 may also provide various web services functions such as retrieving information from the third party servers 146 and the social networking system 120. Information retrieved by the communication module 220 may include profile data corresponding to the user 160 and other members of the social network service from the social networking system 120.

The standardization module 230 may provide a variety of standardization functionality. For example, the standardization module 230 may standardize a variety of attributes, characteristics, or other information. Standardization (also referred to as canonicalization), as used herein, is intended to include generating and/or determining a standardized form of an attribute, characteristic, or other information. For instance, a particular attribute, characteristic, or piece of information may be similar or intended to be similar to another attribute characteristic or piece of information. In this instance, standardizing the information may result in generating a standard form (also referred to as normal form) that reduces a variety of similar representations of the information to a standardized form. For a specific example, various pieces of information may be referring to a single street name (e.g., "market street," "Market st.," or "Market ST"). Standardizing the street name may result in standardized form (e.g., "Market St.") that may represent multiple similar forms. Standardizing a set of attributes, characteristics, or other information may provide for direct comparisons between standardized forms of information and allow for more accurate mathematical analysis as similar information or information that is intended to be similar may be grouped together. Standardization may be performed using a variety of schemes and techniques.

The data module 240 may provide various data functionality such as exchanging information with databases or servers. For example, the data module 240 may access member profiles that include profile data from the database 128. The data module 240 may also extract attributes and/or characteristics from the profile data of member profiles. Similarly, the data module 240 may access social graph data and member activity and behavior data may be accessed from respective databases 130 and 132. In some example embodiments, the data module 240 may exchange information with third party servers 146, client devices 150, and other sources of information.

The analysis module 250 may perform a variety of analyses to facilitate the functionality described herein. For example, the analysis module 250 may analyze profile data and/or extracted attributes and/or characteristics from the profile data provided by the data module 240. In a specific non-limiting example, the analysis module 250 may analyze sequential relationships between positions of members to determine a particular set of positions. The analysis module 250 may perform many other analyses.

Figure 3:
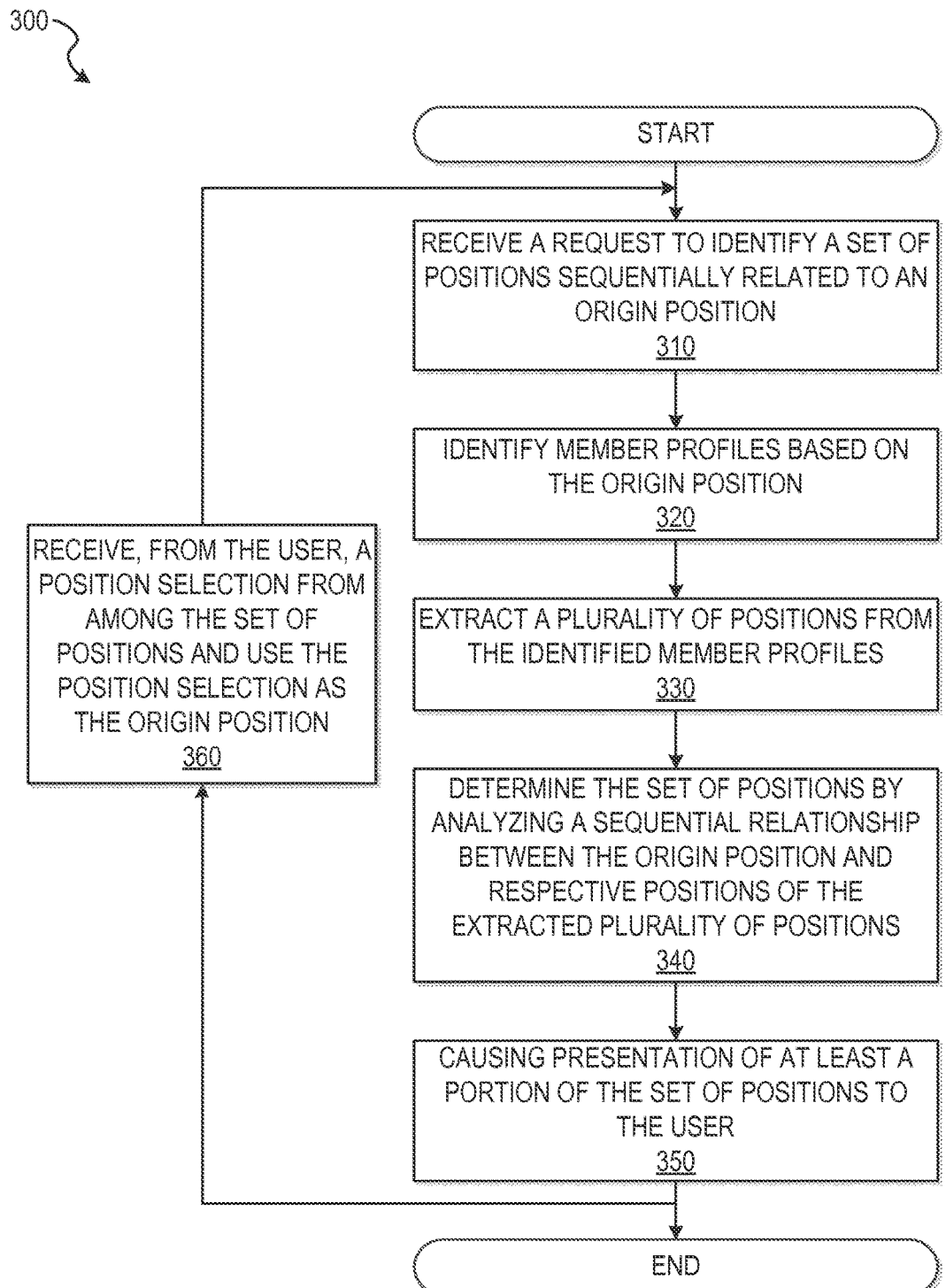
FIG. 3 is a flow diagram illustrating an example method for determining a set of positions from member data of a social network service, according to example embodiments.

FIG. 3 is a flow diagram illustrating an example method 300 for determining a set of positions associated with the origin position, according to example embodiments. The operations of the method 300 may be performed by components of the career navigation system 200. At operation 310, the user interface module 210 may receive a request to identify a set of positions sequentially related to the origin position. The request may be associated with the user of the social network service. In an example embodiment, the user of the social network service may provide an indication of the origin position (e.g., a position of interest to the user) to a user interface configured to receive an indication of the origin position. In this example embodiment, the origin position may be a position selection provided by the user via a user interface configured to receive the position selection.

In another example embodiment, the user may be a member of the social network and current and/or past employment information may be included in the user's profile data. The origin position may be extracted from the employment information of the user. For instance, the data module 240 may extract a position corresponding to a particular job entry included in the employment information of the user (e.g., determine position for a job entry based on text inputted for job title of the job entry). The data module 240 may communicate the extracted position to the user interface module 210 to be used as the origin position.

In yet another example embodiment, the user may provide an indication of the origin position indirectly. For example, the user may select a member profile to view and a current position associated with the selected member profile may be the origin position. A wide variety of interactions with various user interfaces may trigger the communication of the origin position to the user interface module 210.

At operation 320, the data module 240 may identify member profiles from among a plurality of member profiles of the social network service based on the origin position. In an example embodiment, member profiles of members of the social network service that have held the origin position may be identified. For instance, the data module 240 may search for all, or some, member profiles of members of the social network that have held the origin position (e.g., searching database 128). In various example embodiments, members of the social network service may be identified using member identifiers associated with member profiles of members. The member identifiers may be used to access additional profile data associated with members of the social network service.

In further example embodiments, the standardization module 230 may determine a standardized origin position based on the origin position. The data module 240 may identify the plurality of member profiles based on the standardized origin position. For example, the origin position may be "Application Developer," "Java Developer," or "App Developer." The standardized origin position in this example may be "Software Developer." Thus, multiple representations of the same, similar, and/or intended to be similar information may be reduced to a single or fewer representations. The standardization granularity may determine how similar and/or related a particular piece of information may be to a standardized piece of information to be associated with the standardized piece of information. A higher granularity may correspond to more standardized pieces of information and fewer pieces of information being associated with a particular standardized piece of information. The standardization granularity may be dynamically determined or predefined.

At operation 330, the data module 240 may extract a plurality of positions from the identified member profiles. For example, each identified member profile of the identified member profiles may be associated with multiple positions held by a particular member associated with the identified member profile. In an example embodiment, the data module 240 may extract all, or some, of the positions held by respective members of the identified member profiles. In various example embodiments, the data module 240 may extract the plurality of positions from profile data associated with the identified member profiles. The profile data may include job entries inputted by members of the social network. Each job entry may include a job title. The data module 240 may, for example, extract positions from the job entries based on text inputted for job title of the job entries.

In various example embodiments, the data module 240 may extract sequential relationships between positions included in the extracted plurality of positions. For instance, a particular member profile may indicate a first position followed by a second position and so on. The sequential relationship may provide information corresponding to the order in time of the positions corresponding to a particular member of the social network.

In further example embodiments, the data module 240 may access and/or determine a variety of position information corresponding to respective positions of the plurality of positions. For example, education level, salary level (e.g., an average salary computed from salaries of job associated with the position), company type, industry, seniority level, company size, typical location (e.g., city or rural), typical age of employees that hold the position, temporal information (e.g., typical duration of employment), and so on may be extracted. In some example embodiments, the data module 240 may extract the position information from the identified member profiles stored in database 128. In other example embodiments, the data module 240 may retrieve position information from the third party servers 146. For instance, salary information corresponding to a particular position may not be included in the identified member profiles, but the data module 240 may retrieve general salary information, and/or other information, from the third party servers 146 or other sources. In some example embodiments, position information may be derived and/or determined from various pieces of information. For example, the size of a typical company associated with a position may not be available directly, but may be inferred by the data module 240 based on member profiles that indicate employment at the company. The data module 240 may infer a wide variety of position information from various information using many different schemes and techniques.

Referring back to FIG. 3, at operation 340, the analysis module 250 may determine the set of positions from among the extracted plurality of positions based on a sequential relationship between the origin position and respective positions of the extracted plurality of positions. For example, positions associated with a particular member profile may be sequentially ordered based on time (e.g., a first held position first and most recent position last). In various example embodiments, the sequential relationship may comprise a consecutive relationship between the origin position and the respective positions of the plurality of positions. For instance, a consecutive relationship may include a first position followed by a second position without positions in-between the first and second position. Thus, the first and second position may be consecutive in a sequence of multiple positions.

In some example embodiments, the consecutive relationship may include at least one of a succedent relationship associated with succedent positions of the origin position and a precedent relationship associated with precedent positions of the origin position. The precedent positions may include positions that are prior to the origin position and may be consecutive e.g., without positions in-between). The succedent positions may include positions that are after the origin position and may be consecutive (e.g., without positions in-between). In a specific example, if the origin position is vice-principal, the set of positions may include positions precedent (e.g., teacher or principal's assistant) and succedent principal) to the origin position.

In further example embodiments, the standardization module 230 may determine a standardized set of positions based on the extracted plurality of positions. The analysis module 250 may determine the set of positions from among the standardized set of positions. Standardizing the extracted plurality of positions may improve the accuracy of various analyses described herein since it may reduce inaccuracies that may be caused by multiple representations of a same or similar position. In a specific example, the positions may include may be "Application Developer," "Java Developer," or "App Developer." In this example, it may be the case that the multiple representations were intended to indicate "Software Developer." Calculating an occurrence count for each non-standardized position in this example will result in a count of one for "Application Developer," one for "Java Developer," and one for "App Developer." However, an occurrence count for the standardized set of positions will result in three for "Software Developer,"

In still further example embodiments, the analysis module 250 may determine a weight for respective positions of the plurality of positions based on temporal information corresponding to respective positions of the plurality of positions, as further described below in FIG. 7. For instance, a particular position extracted from a particular identified member profile may correspond to a job entry included in the identified member profile. The job entry may include temporal information such as start date, end date, and/or duration of the job. The weight associated with temporal information nearer the current time may have a larger value than the weight associated with temporal information further in the past. The analysis module 250 may use the determined weight for respective positions of the plurality of positions for determining the set of positions. Since the job market is constantly changing, older data may provide less accurate information than more recent data. Thus, older data may be associated with a low weight when performing various analyses.

Referring back to FIG. 3, at operation 350, the user interface module 210 may cause presentation of at least a portion of the set of positions to the user. For example, a portion of precedent positions included in set of positions may be presented to the user as precedent positions. Similarly, a portion of succedent positions included in the set of positions may be presented to the user as succedent positions. The user interface module 210 may employed many different forms of presentations and various types of visualizations to interactively present the set of the positions to the user. In various example embodiments, the analysis module 250 may identify a set of non-duplicative positions from among the set of positions and the user interface module 210 may cause presentation of the at least a portion of the non-duplicative position to the user. In further example embodiments, as described in FIG. 6, the analysis module 250 may determine a subset of positions from among the set of positions based on a variety of metrics. The user interface module 210 may cause presentation of the subset of positions may be presented to the user.

At operation 360, the user interface module 210 may receive, from the user, a position selection from among the set of positions and use the position selection as the origin position, according to example embodiments. Thus, method 300 may be iterative and/or recursive. For instance, the method 300 may be repeatedly performed for new origin positions that corresponding to position selections received from the user. In an example embodiment, the user interface module 210 may receive, from the user, the position selection from among the presented set of positions. The career navigation system 200 may determine a next set of positions sequentially related to the positions selection received from the user. The user interface module 210 may cause presentation of at least a portion of the next set of positions to the user. The position selection may be the origin position for performing the method 300 as described above. In this way, the user may navigate forward and backward through a wide variety of career paths.

In further example, the data module 240 may store the position selection received from the user to be used in additional analysis in the future. For instance, the position selection may be stored in association with the user to determine potential job listings the user may be interested in and/or refine the set of positions determined by method 300.

In alternative example embodiments, the origin position may be a company rather than an employment position. The techniques of method 300 may be equally applied to the origin position being a company. For instance, if the origin position is LinkedIn®, the career path navigation system 200 may identify sequentially related companies associated with member positions sequences. This may assist the user in determining a pathway to a job at LinkedIn® by knowing which prior companies have led to a job at LinkedIn®. Similarly, the method 300 may be applied to other characteristics of job entries.

Figure 4:
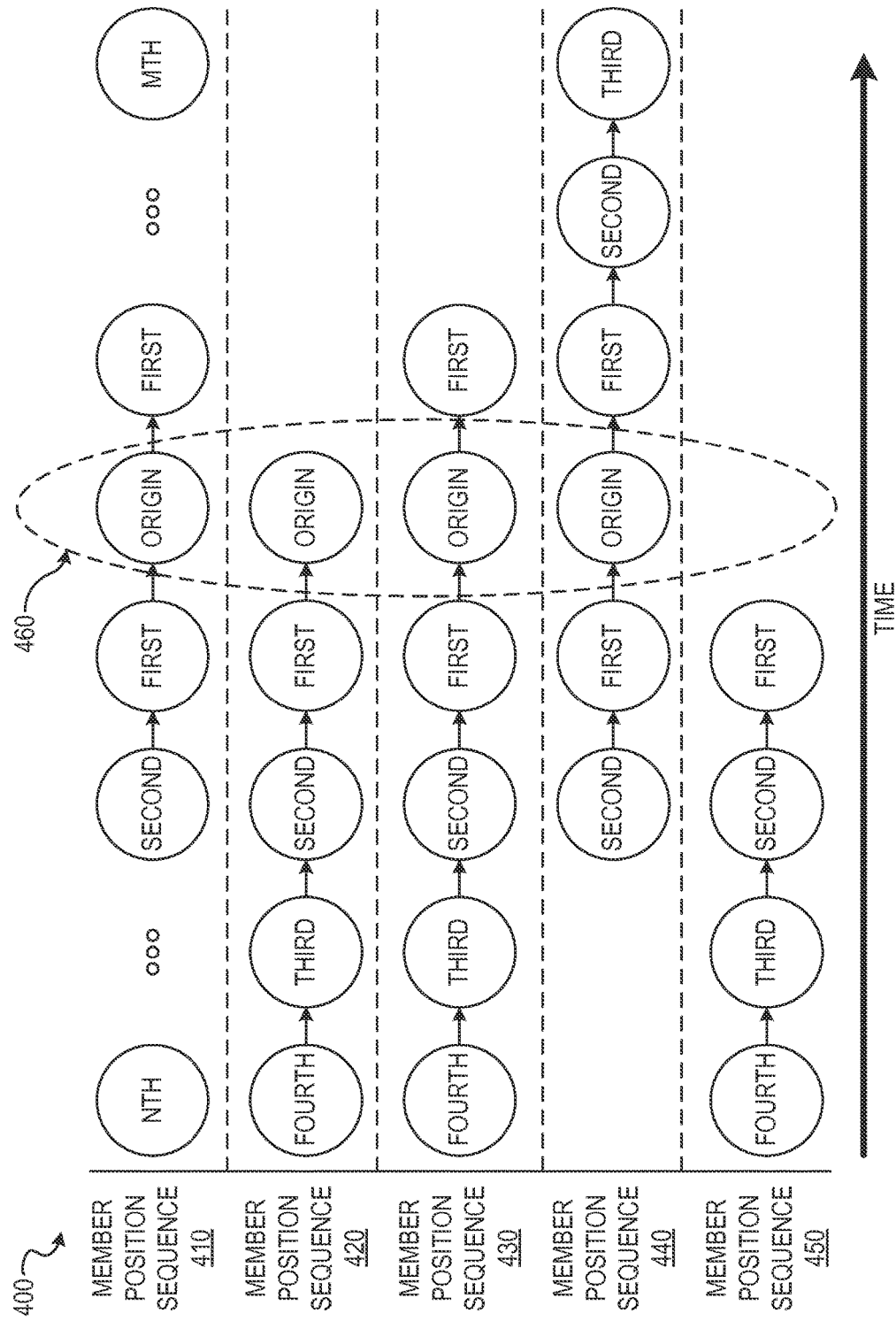
FIG. 4 depicts example member position sequences corresponding to members of a social network service, according to example embodiments.

FIG. 4 depicts example member position sequences 400 corresponding to members of the social network, according to example embodiments. The member position sequences 400 of FIG. 4 may be associated with members of the social network. Respective member position sequences 410, 420, 430, 440, and 450 may have any number of positions in a sequence. The member position sequences 400 may be ordered such that a first position in time is before a most recent position. For instance, the member position sequence 410 may include an nth position that is a first position and an mth position that is a most recent position in time. Member position sequences 400 that include the origin position, as illustrated by circle 460, may be identified by the data module 240 as described above. Thus, member position sequence 450 may not be identified and the positions included in member position sequence 450 may not be included in the extracted plurality of positions as described above. The member position sequences 410, 420, 430, and 440 may be identified by the data module 240 and the positions included in the member positions sequences 410, 420, 430, and 440 may be included in the extracted plurality of positions.

The positions of FIG. 4 labeled "FIRST" may be positions that have a consecutive relationship with the origin position, labeled "ORIGIN." In other words, the positions labeled "FIRST" are next to the origin position in the member position sequences without positions in-between. The analysis module 250 may identify the positions labeled "FIRST" as having a consecutive relationship with the origin positions and include the positions labeled "FIRST" in the set of positions to be presented to the user.

In some example embodiments, logic may be implemented to skip positions in the sequence. For instance, if the next position after the origin is determined to be skipped, the next position after the skipped position may have a consecutive relationship with the origin position. In an example embodiment, the analysis module 250 may determine skip criteria to determine to skip a position. The skip criteria may include criteria such as duration of the positions, location of the position, seniority of the position, type of position (e.g., a temporary position versus a full time position), and so on. In a specific example, a teacher aspiring to become a principal may be temporarily out of work and may have accepted a position as a graphic designer while seeking a principal position at a school. The duration of the graphic designer position may be short and the teacher may subsequently accept a principal position at a school. Similarly, logic may be implemented to skip or ignore positions that are simultaneously held (e.g., a full time teach working part time as a graphic designer). The analysis module 250 may determine to skip the graphic designer position based on duration or other criteria.

Figure 5:
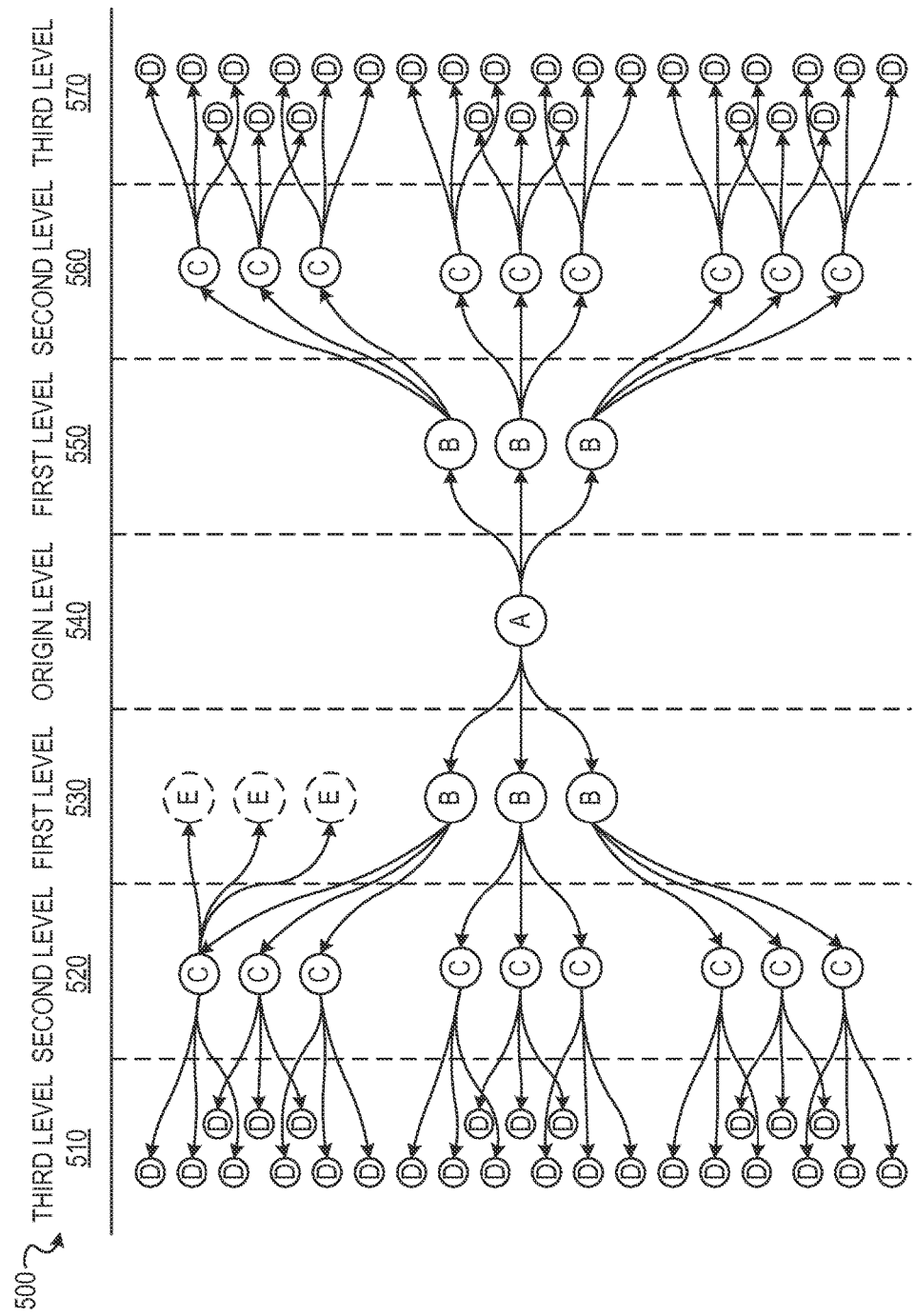
FIG. 5 depicts relationships between example positions, according to example embodiments.

FIG. 5 depicts relationships between example positions 500 associated with the origin position, according to example embodiments. At the operation 310 of FIG. 3, the user interface module 210 may receive, from the user, a request to identify a set of positions sequentially related to the origin position (labeled "A" and shown to be included in origin level 540). At the operation 320, the data module 240 may identify member profiles based on the origin position. Subsequently, at the operation 330, the data module 240 may extract a plurality of positions from the member profiles. The third level 510, second level 520, first level 530, first level 550, second level 560, and third level 570 may include positions extracted from the member profiles as described above. At the operation 340, the analysis module 250 may determine the set of positions by analyzing the sequential relationship between the origin position and respective positions of the extracted plurality of positions. The arrowed lines of FIG. 5 indicate relationships between positions of FIG. 5 (positions are labeled "A," "B," "C," "D," and "E").

As shown in FIG. 5, the first level 530 may include positions, labeled "B," that are precedent positions to the origin position. That is to say, the positions labeled "B" of the first level 530 are directly prior to the origin position in a particular sequence of positions associated with a member profile. The first level 550 may include positions, labeled "B," that are succedent positions to the origin position. In other words, the positions labeled "B" of the first level 550 are directly after the origin position in a particular sequence of positions corresponding to a member profile. In various example embodiments, the analysis module 250 may determine the set of positions that includes positions with a succedent relationship and a precedent relationship such as positions labeled "B" of FIG. 5. In various example embodiments, the analysis module 250 may determine the set of positions that includes positions with relationships such as the positions included in the second level 520 and 560 (positions labeled "C"), positions included in the third level 510 and 570 (positions labeled "D"), positions with other sequential relationships to the origin positions, and positions with other relationships to the origin position. In some example embodiments, the user interface module 210 may generate a relationship visualization that represents the relationships among the origin position and positions included in the set of positions. The user interface module 210 may cause the presentation of the relationship visualization.

In further example embodiments, the user may navigate to positions by providing the position selection to the user interface module 210 (e.g., clicking or tapping on a particular position). For instance, the user may navigate to a particular position of the first level 530. In response to the user navigating to another position, the career navigation system 200 may perform the method 300 using the position navigated (e.g., the position selection) to as the origin position. In another example, if the user navigates to a particular position of the second level 520, the set of positions determined by the analysis module 250 may include positions sequentially related to the particular position of the second level 520. As shown in FIG. 5, a particular position of the second level 520 is sequentially related to positions labeled "E" and positions labeled "D." The user may navigate to any, or some, of the positions related to the origin position in this way.

Figure 6:
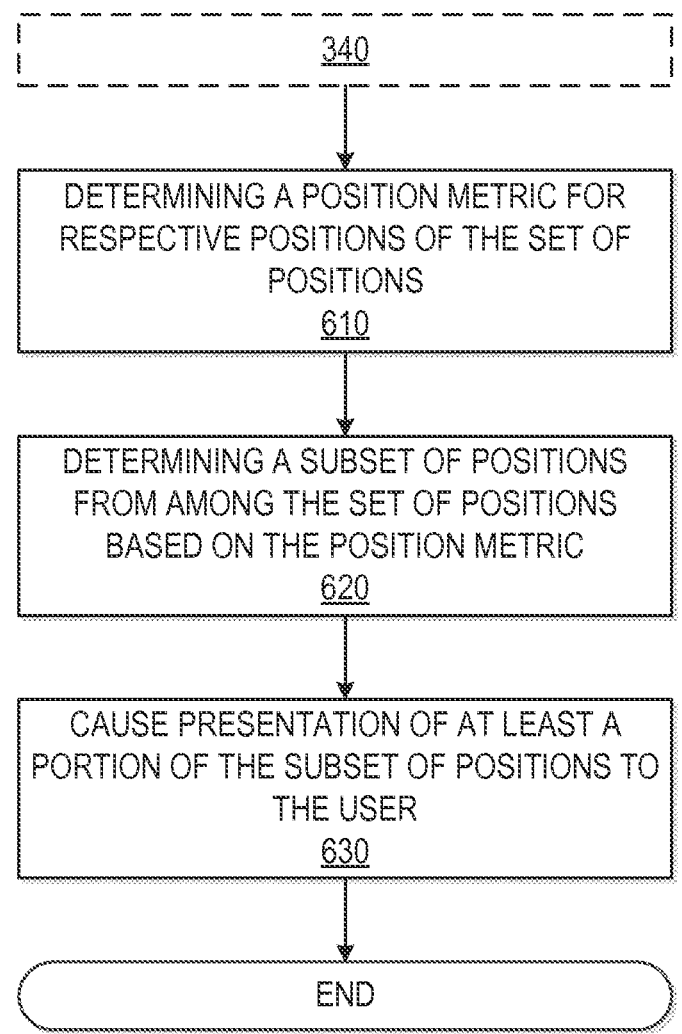
FIG. 6 is a flow diagram illustrating further operations for determining a set of positions from member data of a social network service, according to example embodiments.

FIG. 6 is a flow diagram illustrating further operations of the example method 300 for determining a set of positions associated with the origin position, according to example embodiments. Subsequent to determining the set of positions at the operation 340, at operation 610, the analysis module 250 may determine a position metric for respective positions of the set of positions. The position metric may include a wide variety of metrics associated with the set of positions. In an example embodiment, the position metric may comprise a transition likelihood metric that indicates a likelihood of a transition from the origin position to a particular position among the set of positions. For example, the transition likelihood metric may be an occurrence frequency calculated by determining the number of occurrences of respective positions among the set of positions. The occurrence of respective positions among the set of positions may be performed on the standardized set of positions as described above. In some example embodiments, the user interface module 210 may cause presentation of the position metric to the user. For instances, the position metric may be presented along with the positions included in the set of positions and/or the set of positions may be presented in a sorted and/or ranked order based on the position metric.

In a specific example, the origin position may be a teacher position. Thousands and thousands of member profiles may be identified based on the teacher position. The plurality of positions may be extracted from the member profiles and standardized. The succedent positions (e.g., vice-principal) and precedent positions (e.g., teacher's assistant) of the teacher position may be identified. The precedent positions may include a wide variety of diverse positions (e.g., hair stylist, musician). By calculating an occurrence frequency for each precedent position, it may be revealed that particular precedent positions are common pathways to the teacher position (e.g., among the thousands of precedent positions, guitarist may be very uncommon while teacher's assistant is the most common).

In further example embodiments, the position metric may comprise a wide variety of position characteristic metrics associated with characteristics of a particular position among the set of positions. For example, the characteristic metric may include education level, salary level, company type, seniority level, company size, and so on. The position characteristic metric may be useful in identifying positions among the set of positions that are associated with a particular characteristic. In the example where the origin position is a teacher position, a wide variety of succedent positions may correspond to the teacher position. It may be useful to identify succedent positions that, for example, have the highest salary, call for the least education, that are compatible with a particular degree, and so forth.

At operation 620, the analysis module 250 may determine a subset of positions from among the set of positions based on the position metric. For instance, the set of positions may include all precedent positions and succedent positions of the origin position. If the position metric comprises the likelihood of the transition metric, the positions among the set of positions with a high likelihood of transition may be identified and included in the subset of positions. For a specific example, if the origin position is a teacher position and many precedent positions are included in the set of positions, the subset of positions may include the top three most common precedent positions. Many other schemes may be employed to determine the subset of positions from among the set of positions based on the position metric.

At operation 639, the user interface module 210 may cause presentation of at least a portion of the subset of positions to the user. Similar to the operation 350 described above, the subset of positions may be interactively presented to the user in a variety of forms. The user may navigate the subset of positions as described above in relation to the set of positions.

Figure 7:
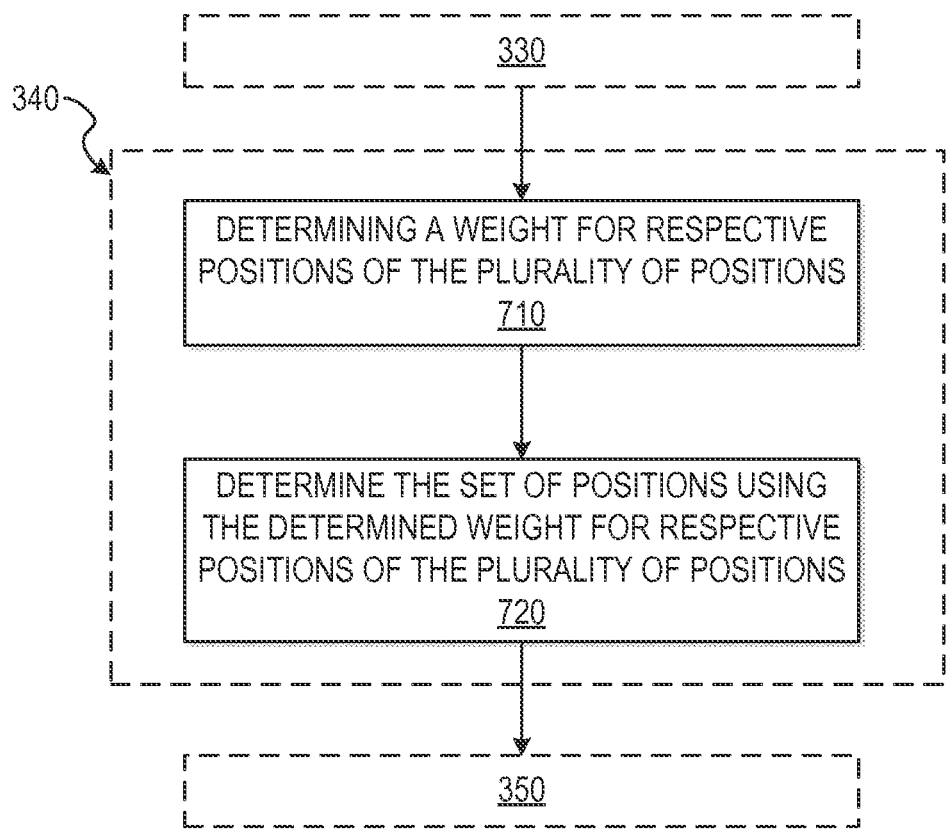
FIG. 7 is a flow diagram illustrating further operations for determining a set of positions from member data of a social network service using weights, according to example embodiments.

FIG. 7 is a flow diagram illustrating further operations of the operation 340, according to example embodiments. Subsequent to the data module 240 extracting a plurality of positions from the member profiles at the operation 330, at the operation 340, the analysis module 250 may perform operations 710 and 720. At the operation 710, the analysis module 250 may determine a weight for respective positions of the plurality of positions based on temporal information corresponding to respective positions of the plurality of positions. The weight associated with temporal information nearer the current time may have a larger value than weight associated with temporal information further in the past. The analysis module 250 may use the determined weight for respective positions of the plurality of positions for determining the set of positions. Since the job market is constantly changing, older data may provide less accurate information than more recent data. Thus, older data may be associated with a low weight when performing various analyses.

In further example embodiments, the determined weight may be used by the analysis module 250 when determining the position metric. For example, if the position metric comprises the occurrence frequency, positions with a low weight may not influence the resulting occurrence frequency as much as positions associated with a high weight. The determined weight may be used by the analysis module 250 when determining the position metric in a variety of other ways.

At the operation 720, the analysis module 250 may determine the set of positions using the determined weight for respective positions of the plurality of positions. For example, positions associated with a low weight may be excluded from the set of positions as they may be irrelevant. The analysis module 250 may use the determined weight to determine the set of positions in many other ways.

Figure 8:
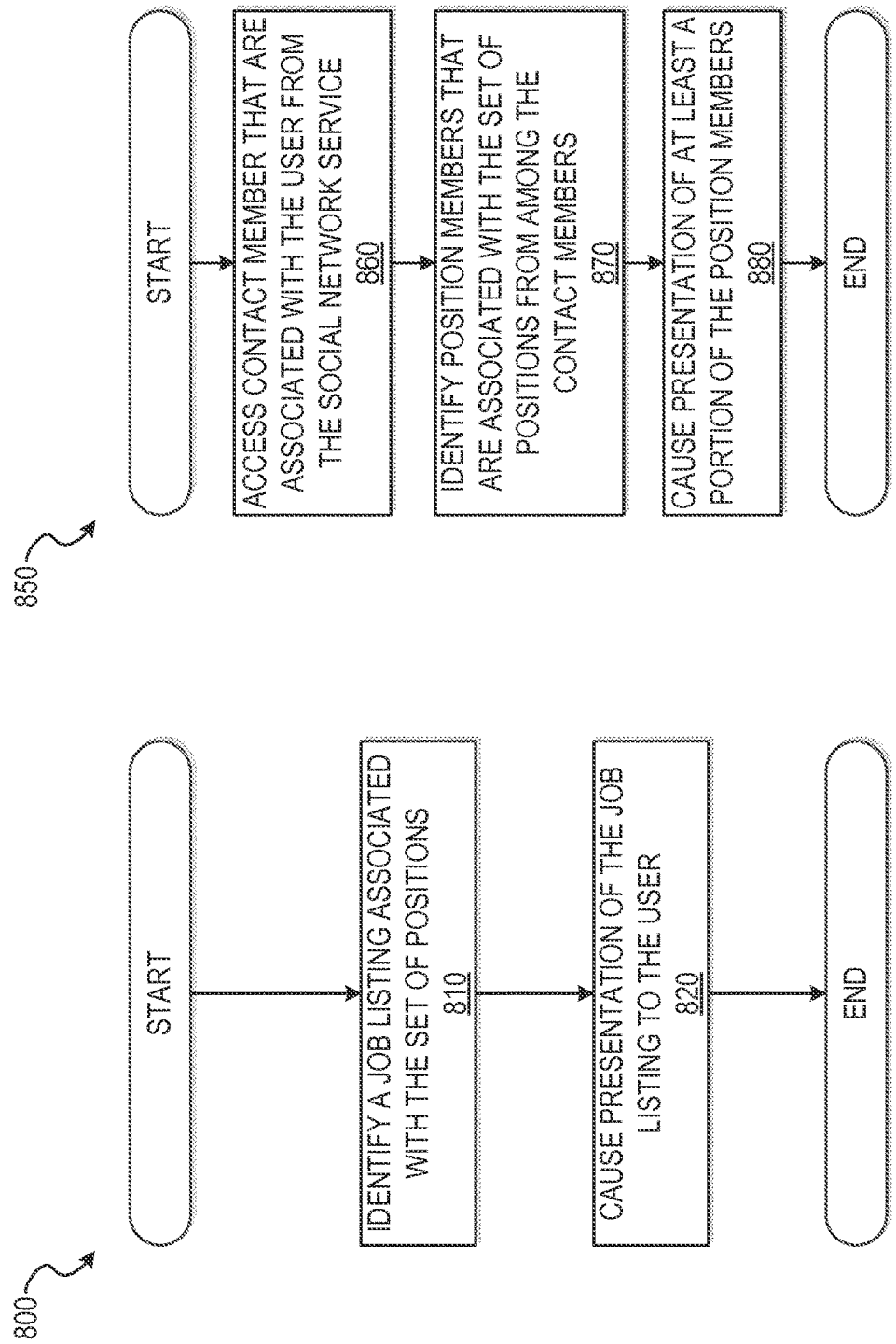
FIG. 8A is a flow diagram illustrating an example method for identifying job listings associated with a set of positions, according to example embodiments.
FIG. 8B is a flow diagram illustrating an example method for identifying contact members associated with a set of positions, according to example embodiments.

FIG. 8A is a flow diagram illustrating an example method 800 for identifying job listings associated with the set of positions, according to example embodiments. The operations of the method 800 may be performed by components of the career navigation system 200. At operation 810, the data module 240 may identify a job listing or job listings associated with at least one of the origin position and the set of positions. For example, if a particular position included in the set of positions is a principal position, job listings for principals may be identified. In some example embodiments, user profile data corresponding to the user may be accessed and used to refine the identified job listings (e.g., based on the user location as determined from the profile data, job listings near the location may be identified).

At the operation 820, the user interface module 210 may cause presentation of the job listing to the user. The user interface module 210 may present the job listing or job listings to the user in a variety of interactive forms.

FIG. 8B is a flow diagram illustrating an example method 850 for identifying contact members associated with the set of positions, according to example embodiments. The operations of the method 850 may be performed by components of the career navigation system 200. At operation 860, the data module 240 may access contact members that are associated with the user from the social network service.

At operation 870, the data module 240 may identify position members that are associated with at least one of the origin position and the set of positions from among the contact members. For instance, if the set of positions includes a particular position for a principal, contact members may be identified that currently hold, or have held in the past, the position of principal.

At operation 880, the user interface module 210 may cause presentation of at least a portion of the position members to the user. The user interface module 210 may present the position members to the user in a variety of interactive forms.

Figure 9:
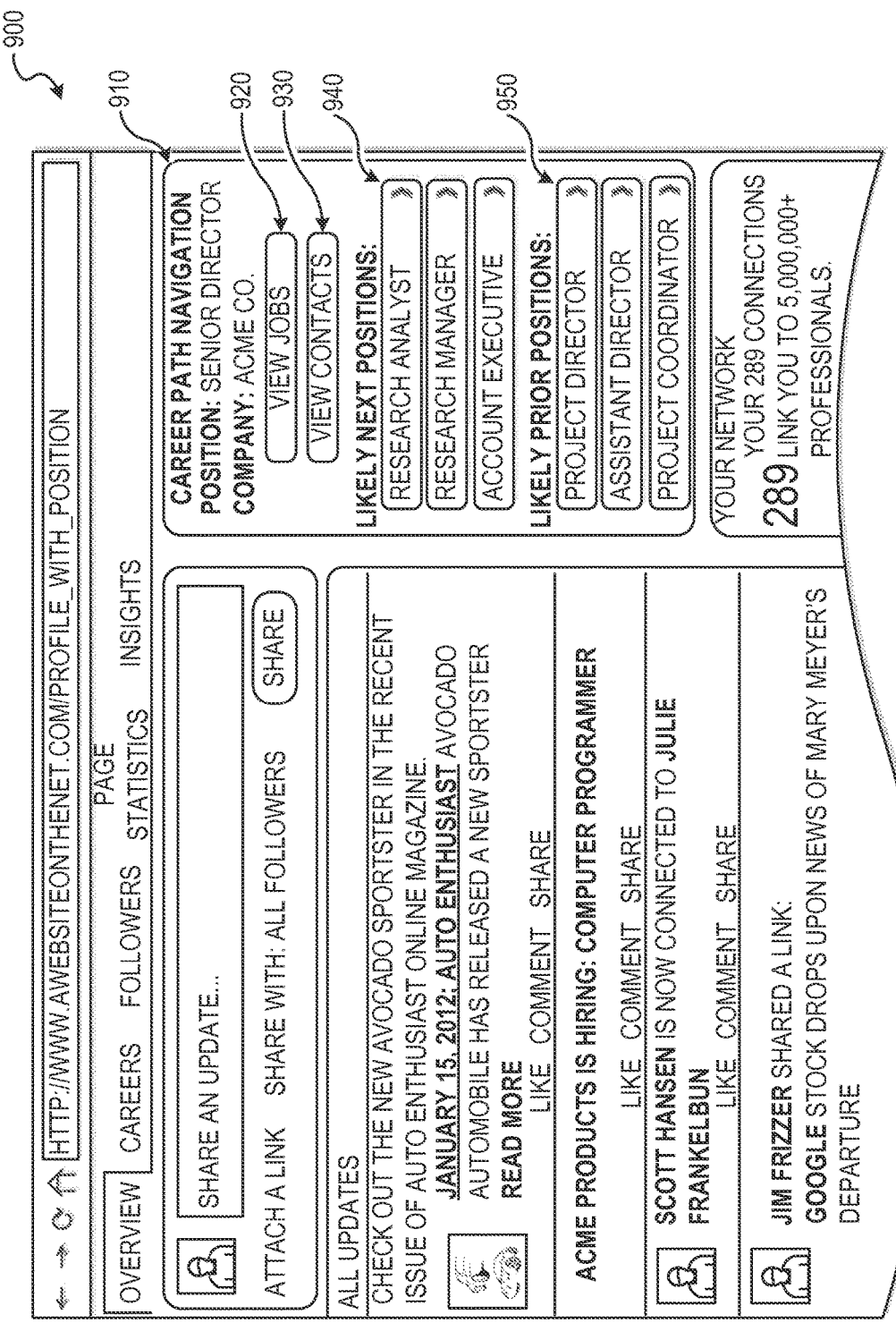
FIG. 9 depicts an example user interface for interactively presenting career navigation to the user, according to example embodiments.

FIG. 9 depicts an example user interface 900 for interactively presenting the career navigation to the user. User interface element 910 may be a career path navigation interface that allows the user to interactively navigate career paths based on the origin position. The user interface 900 may include user interface element 920 that, when activated by the user, may present job listings associated with the origin position and/or the set of positions. User interface element 930 may present, when activated by the user, position members associated with the origin position and/or the set of positions. User interface element 940 and user interface element 950 may present at least a portion of the set of positions to the user. For example, the user interface element 940 may present succedent positions to the user and the user interface element 950 may present precedent positions to the user. In some example embodiments, the position information associated with positions included in the set of positions may be presented to the user (e.g., typical education level, typical salary level, and/or typical seniority level). The user may interact with the user interface element 940 to navigate career paths. For instance, activating a particular position of user interface element 940 may present a similar user interface to user interface 900 with the origin position being the activated position. In this way, the user may interact with the career navigation system 200 and navigate to any, or some, positions associated with the origin position.

Figure 10:
FIG. 10 depicts an example user interface for presenting contact members associated with a set of positions to the user, according to example embodiments.

FIG. 10 depicts an example user interface 1000 for interactively presenting the position members to the user. The user interface element 1010 may correspond to a particular position member (e.g., contact members of the user associated with the origin position and/or the set of positions). Similarly user interface element 1020 may present another member of the positions members. Many different forms and styles of presentation may be employed by the user interface module 210 to interactively present position members to the user.

Modules, Components, and Logic

Figure 11:
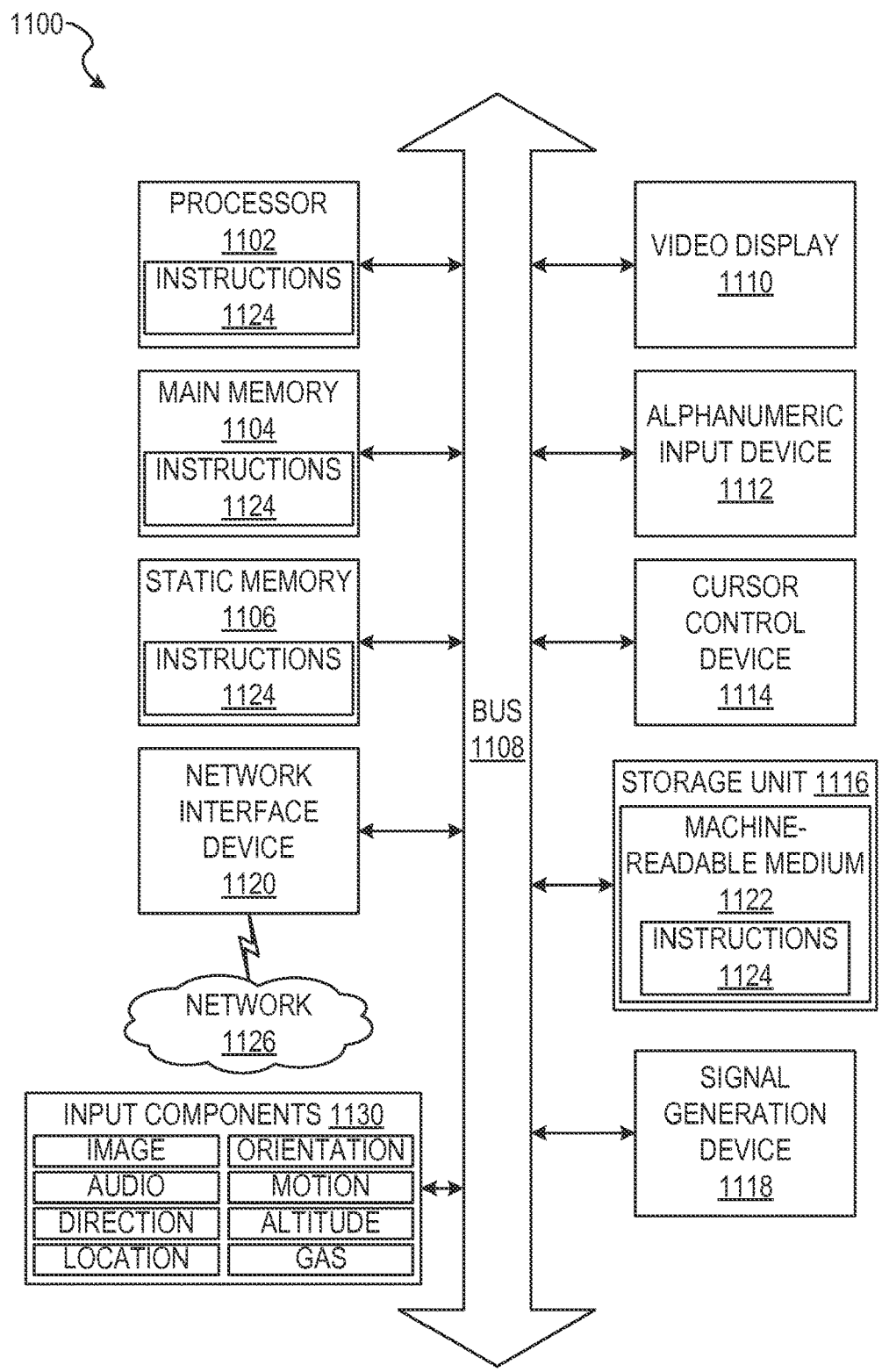
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1124 (e.g., software, a program, an application, an applet, an app, or other executable code) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine 1100 is illustrated, the term "machine" shall also be taken to include a collection of machines 1100 that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a video display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or all three, during execution thereof by the machine 1100. Accordingly, the main memory 1104, static memory 1106 and the processor 1102 may be considered as machine-readable media 1122. The instructions 1124 may be transmitted or received over a network 1126 via the network interface device 1120.

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions 1124. The term "machine-readable medium" shall also be taken to include any medium, or combination of multiple media, that is capable of storing instructions (e.g., instruction 1124) for execution by a machine (e.g., machine 1100), such that the instructions, when executed by one or more processors of the machine 1100 (e.g., processor 1102), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shah accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 1122 is non-transitory in that it does not embody a propagating signal. However, labeling the machine-readable medium 1122 as "non-transitory" should not be construed to mean that the medium is incapable of movement; the medium should be considered as being transportable from one physical location to another. Additionally, since the machine-readable medium 1122 is tangible, the medium may be considered to be a machine-readable device.

The instructions 1124 may further be transmitted or received over a communications network 1126 using a transmission medium via the network interface device 1120 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1122 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1102, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions described herein. As used herein, "processor-implemented module" refers to a hardware module implemented using one or more processors 1102.

Similarly, the methods described herein may be at least partially processor-implemented, with a processor 1102 being an example of hardware. For example, at least some of the operations of a method may be performed by one or more processors 1102 or processor-implemented modules. Moreover, the one or more processors 1102 may also operate to support performance of the relevant operations in a "cloud computing" environment or as a "software as a service" (SaaS). For example, at least some of the operations may be performed by a group of computers (as examples of machines 1100 including processors 1102), with these operations being accessible via the network 1126 (e.g., the Internet) and via one or more appropriate interfaces (e.g., an application program interface (API)).

The performance of certain of the operations may be distributed among the one or more processors 1102, not only residing within a single machine 1100, but deployed across a number of machines 1100. In some example embodiments, the one or more processors 1102 or processor-implemented modules may be located in a single geographic location (e.g., within a home environment, an office environment, or a server farm). In other example embodiments, the one or more processors 1102 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
incorporating a set of instructions for implementing a career navigation system into one or more memories of a social network system, the set of instructions configuring one or more computer processors of the social network system to perform operations for implementing a user interface that includes a user navigable career path for presentation on a client device, the operations comprising:
receiving an indication of a first origin position in the user-navigable career path via the user interface presented on the client device;
in response to the indication, depicting in the user interface a first level of succedent likely-transition positions relative to the first origin position and a first level of precedent likely-transition positions relative to the first origin position;
calculating position metrics for the first level of succedent likely-transition positions and the first level of precedent likely-transition positions, the position metrics indicating likelihoods of transitions from the first level of precedent likely-transition positions to the first origin position and from the first origin position to the first level of succedent likely-transition positions;
ordering the first level of succedent likely-transition positions and the first level of precedent likely-transition positions in the user interface according to the position metrics;
receiving a user selection of one of the first level of succedent likely-transition positions from the user interface; and
in response to the receiving of the user selection, causing the user navigable career path to be updated on the client device, the updating including depicting a new origin position, a new first level of succedent likely-transition positions, and a new first level of precedent likely-transition positions, the new first level of succedent likely-transition positions being a subset of a second level of succedent likely-transition positions, the subset of the second level of succedent likely-transition positions corresponding to the new origin position.

2. The method of claim 1, wherein each of the position metrics includes a transition likelihood metric that comprises an occurrence frequency calculated by determining a number of occurrences of a transition from the first origin position to a particular position among the first level of succedent likely-transition positions.

3. The method of claim 1, wherein each of the position metrics comprises a position characteristic metric associated with characteristics of a particular position among the first level of succedent likely-transition positions, the characteristic metric including at least one of education level, salary level, company type, seniority level, or company size.

4. The method of claim 1, further comprising:
identifying a job listing associated with the first level of succedent likely-transition positions; and
causing presentation of the job listing on the user interface of the client device.

5. The method of claim 1, further comprising:
accessing contact members that are associated with the user from the social network system;
identifying a position member associated with the first level of succedent likely-transition position from among the contact members; and
causing presentation of the identified position member on the user interface presented on the client device.

6. The method of claim 1, further comprising:
storing the position selection received from the client device for subsequent analysis.

7. The method of claim 1, further comprising:
extracting temporal information for respective positions of the first level of succedent likely-transition positions from identified member profiles, the extracted temporal information including at least one of a start date for the respective positions, an end date for the respective positions, or a duration for the respective positions;
determining a weight for the respective positions based on the extracted temporal information corresponding to the respective positions, the weight associated with temporal information nearer the current time having a larger value;
weighting the position metric using the determined weight; and
performing the ordering based on the weighting.

8. The method of claim 1, further comprising:
determining a standardized set of positions for the first level of succedent likely-transition positions, the first level of likely-transition positions being determined from among the standardized set of positions.

9. A system comprising:
one or more computer processors;
one or more computer memories;
a set of instructions incorporated into the one or more computer memories, the set of instructions configuring the one or more computer processors to perform operations for implementing a user interface for presentation on a client device that includes a user-navigable career path, the operations comprising:
receiving a position selection from a client device of a user;
receiving an indication of a first origin position in the user-navigable career path via the user interface;
in response to the indication, depicting in the user interface a first level of succedent likely-transition positions relative to the first origin position and a first level of precedent likely-transition positions relative to the first origin position;
calculating position metrics for the first level of succedent likely-transition positions and the first level of precedent likely-transition positions, the position metrics indicating likelihoods of transitions from the first level of precedent likely-transition positions to the first origin position and from the first origin position to the first level of succedent likely-transition positions;
ordering the first level of succedent likely-transition positions and the first level of precedent likely-transition positions in the user interface according to the position metrics;
receiving a user selection of one of the first level of succedent likely-transition positions from the user interface; and
in response to the receiving of the user selection, causing the user navigable career path to be updated on the client device, the updating including depicting a new origin position, a new first level of succedent likely-transition positions, and a new first level of precedent likely-transition positions, the new first level of succedent likely-transition positions being a subset of a second level of succedent likely-transition positions, the subset of the second level of succedent likely-transition positions corresponding to the new origin position.

10. The system of claim 9, wherein each of the position metrics includes a transition likelihood metric that comprises an occurrence frequency calculated by determining a number of occurrences of a transition from the first origin position to a particular position among the first level of succedent likely-transition positions.

11. The system of claim 9, wherein each of the position metrics comprises a position characteristic metric associated with characteristics of a particular position among the first level of succedent likely-transition positions, the characteristic metric including at least one of education level, salary level, company type, seniority level, or company size.

12. A machine-readable medium not having any transitory signals and storing instructions that, when executed by at least one processor of a machine, cause the machine to perform operations for implementing a user interface that includes a user-navigable career path for presentation on a client device, the operations comprising:
 receiving a position selection from a client device of a user;
 receiving an indication of a first origin position in a user-navigable career path via the user interface;
 in response to the indication, depicting in the user interface a first level of succedent likely-transition positions relative to the first origin position and a first level of precedent likely-transition positions relative to the first origin position;
 calculating position metrics for the first level of succedent likely-transition positions and the first level of precedent likely-transition positions, the position metrics indicating likelihoods of transitions from the first level of precedent likely-transition positions to the first origin position and from the first origin position to the first level of succedent likely-transition positions;
 ordering the first level of succedent likely-transition positions and the first level of precedent likely-transition positions in the user interface according to the position metrics;
 receiving a user selection of one of the first level of succedent likely-transition positions from the user interface; and
 in response to the receiving of the user selection, causing the user navigable career path to be updated on the client device, the updating including depicting a new origin position, a new first level of succedent likely-transition positions, and a new first level of precedent likely-transition positions, the new first level of succedent likely-transition positions being a subset of a second level of succedent likely-transition positions, the subset of the second level of succedent likely-transition positions corresponding to the new origin position.

13. The method of claim 1, wherein the new first level of precedent likely-transition positions is identified based on an analysis of member profiles specifying the new origin position as a current position.

\* \* \* \* \*